(12) United States Patent
Julicher

(10) Patent No.: US 6,916,109 B2
(45) Date of Patent: Jul. 12, 2005

(54) HITCH LOCATING DEVICE

(76) Inventor: Jack Julicher, 43 Clayton Crescent, Bowmanville, Ontario (CA), L1C 4P3

( * ) Notice: Subject to any disclaimer, the term of this patent is extended or adjusted under 35 U.S.C. 154(b) by 0 days.

(21) Appl. No.: 10/349,994

(22) Filed: Jan. 24, 2003

(65) Prior Publication Data

US 2004/0012974 A1 Jan. 22, 2004

(30) Foreign Application Priority Data

Jan. 24, 2002 (CA) ............................................ 2369192

(51) Int. Cl.⁷ ................................................. B60D 1/06
(52) U.S. Cl. ......................... 362/487; 362/505; 362/540; 362/485; 280/477
(58) Field of Search ................................. 362/505, 540, 362/485; 280/477; 340/431

(56) References Cited

U.S. PATENT DOCUMENTS

| | | | |
|---|---|---|---|
| 3,818,599 A | | 6/1974 | Tague |
| 3,866,328 A | | 2/1975 | Alexander et al. |
| 4,313,264 A | | 2/1982 | Miller, Sr. |
| 4,621,432 A | | 11/1986 | Law |
| 4,666,176 A | * | 5/1987 | Sand .......................... 280/477 |
| 4,925,287 A | | 5/1990 | Lord et al. |
| 5,224,270 A | | 7/1993 | Burrus |
| 6,302,567 B1 | * | 10/2001 | Gamble, Sr. ................. 362/505 |

FOREIGN PATENT DOCUMENTS

CA 1278716 C 12/1987

OTHER PUBLICATIONS

Inventor's Digest, Nov./Dec. 1994 p. 33.

* cited by examiner

*Primary Examiner*—Stephen Husar
*Assistant Examiner*—Anabel Ton
(74) *Attorney, Agent, or Firm*—Birch, Stewart, Kolasch & Birch, LLP

(57) ABSTRACT

The hitch-locating device has a telescopic stem to which a pedestal is attached at one end and a light is attached at the opposite end. Two such devices are used in conjunction with a hitching assembly having a hitch-cap at the front end of a trailer and a ball connected to a tongue which extends to the rear of a towing vehicle. A magnet is located in each pedestal for removably attaching one hitch-locating device to or adjacent to the ball and the other to or adjacent to the hitch-cap. In use, the devices are placed on or adjacent to the hitch-cap and the ball and the vehicle is backed toward the trailer. The driver of the vehicle watches the two hitch-locating devices in his rear view mirror and he steers the vehicle in order to bring the two devices into alignment. When the vehicle reaches the trailer, one of the devices will be knocked over, either by the tongue at the rear of the vehicle or by the front end of the trailer. When the driver observes this, he will know that the hitch-cap and the ball are in position to be interconnected.

1 Claim, 3 Drawing Sheets

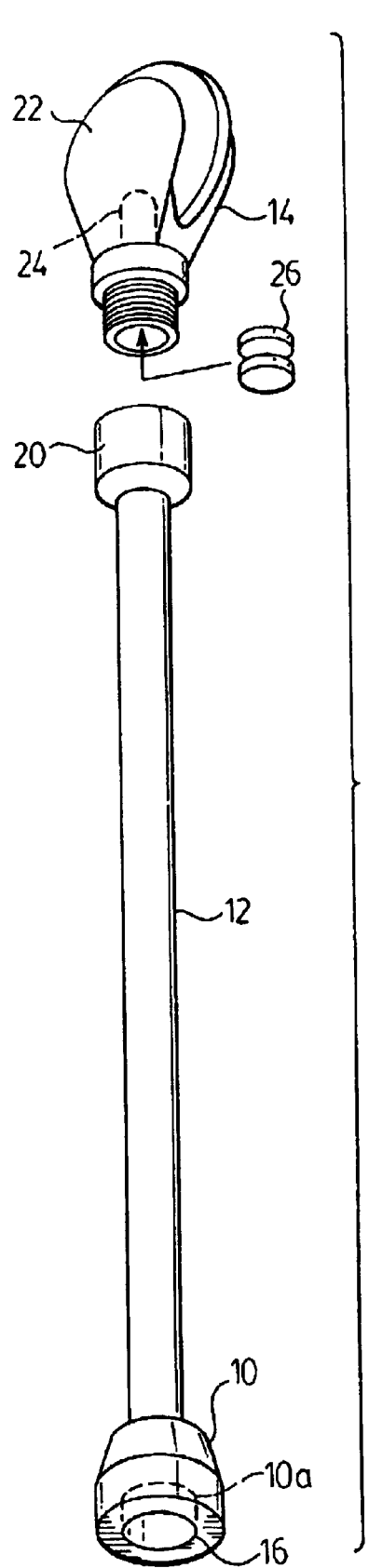
FIG. 1.
FIG. 2.

HITCH LOCATING DEVICE

BACKGROUND OF THE INVENTION

This invention relates to accessories for a hitching assembly and more particularly to a device for facilitating the attachment of a hitch-cap to the ball of a standard hitching assembly.

A conventional hitching assembly is composed of two basic components, a hitch-cap or socket and a ball. The hitch-cap is attached to the front arm of the trailer while the ball is connected to a backwardly extending tongue or bar at the rear of die towing vehicle. The vehicle is connected or "hitched" to the trailer when the ball is within the hitch-cap.

Connecting the vehicle to the trailer usually requires two persons. One person drives the vehicle while the other stands beside the trailer and guides the driver. The driver needs the guidance of the second person because he cannot see the ball on his vehicle nor when the vehicle is close to the trailer, can he see the hitch-cap. Only if the driver resorts to trial and error can lie connect the hitching assembly on his own.

SUMMARY OF THE INVENTION

I have invented a hitch-locating device which makes it possible for a driver to connect a hitching assembly without the assistance of a second person. Two such devices are required for the purpose. One device is placed on or adjacent to the ball and the other on or adjacent to the hitch-cap of the hitching assembly. Both devices are plainly visible to the driver when he is backing up, even at night or when weather conditions are adverse.

The driver backs the vehicle toward the trailer and as he does so, he watches the two hitch-locating devices in his rear view mirror and he steers the vehicle in order to bring the two devices into alignment.

When the vehicle reaches the trailer, one of the hitch-locating devices will be knocked over, either by the tongue on the rear of the vehicle or by the front end of the trailer. When the driver observes this, he will know that the hitch-cap and the ball are in position to be interconnected. He will then stop the vehicle, get out and go to the rear of the vehicle where he will interconnect the two. Afterward he will lock the ball in place to prevent unintended separation of the ball from the hitch-cap when the vehicle is being used to move the trailer.

Briefly, the hitch-locating device of my invention comprises a magnetized base; an indicator; and a stem which extends between the base and the indicator.

DESCRIPTION OF THE DRAWINGS

The hitch-locating device of the invention is described with reference to the accompanying drawings in which:

FIG. 1 is a partly exploded perspective view of the hitch-locating device, in a retracted position;

FIG. 2 is a perspective view, of the device, in a smaller scale, in an extended position;

Like reference characters refer to like parts throughout the description of the drawings.

DESCRIPTION OF THE PREFERRED EMBODIMENT

Figure 3:
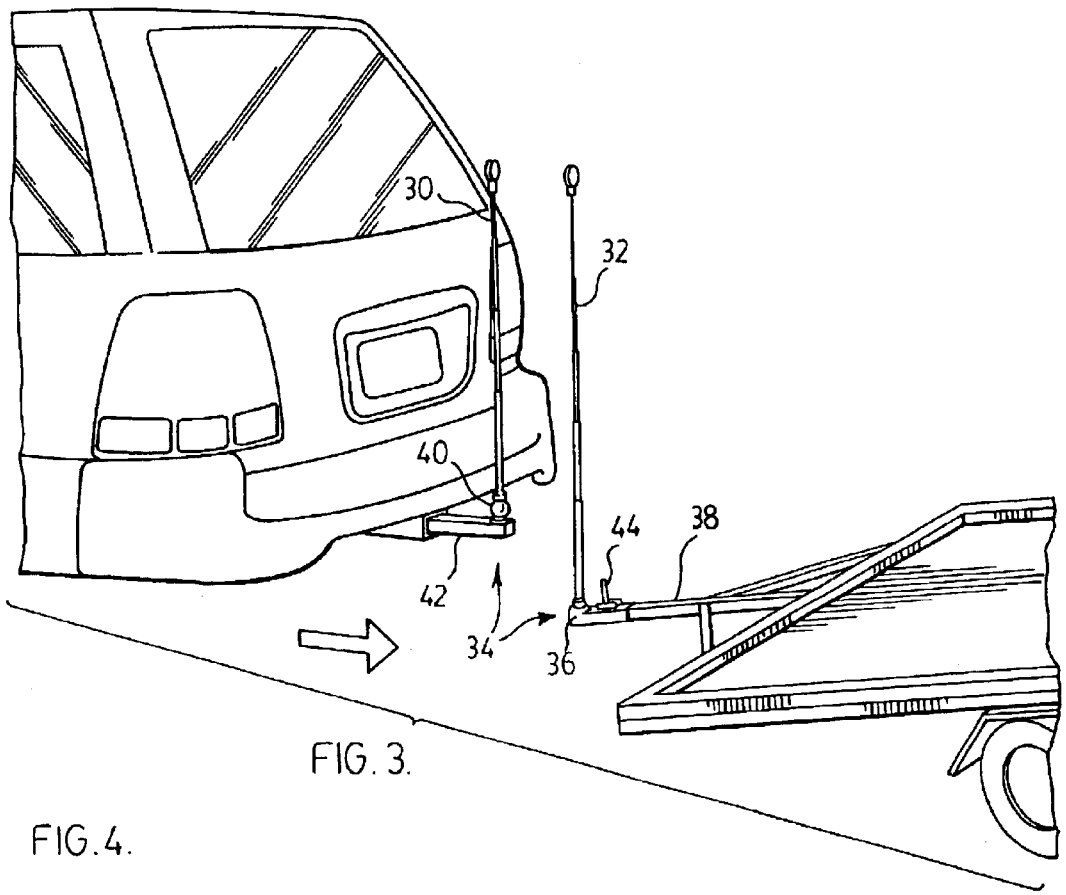
FIG. 3 is a perspective view, in smaller scale, of two hitch-locating devices in combination with a conventional hitch, when unconnected.

With reference to FIGS. 1 and 2, the hitch-locating device of the invention Includes a pedestal 10, a stem 12 and an indicator 14. The pedestal has a lower cylindrical portion 10a which is hollow for accommodation of a cylindrical magnet 16.

The stem is telescopic and is made up of a number of tubes 12a, b, c and so on. The diameters of the tubes decrease upwardly and each tube is received within the tube immediately beneath it when the stem is retracted or closed for storage. When the stem is closed, its effective length is least or shortest.

The stem is opened by pulling the indicator away from the pedestal in order to draw each tube outwardly from the tube immediately beneath it. When each tube is outside the tube beneath it, the stem has reached its full effective length.

The indicator is made up of a base 20 and a hollow transparent or translucent cover 22 through which light may penetrate. An electric bulb 24 is mounted within the cover. The bulb is threadably received in a socket and the socket is electrically connected to a battery 26 which is located in a compartment in the base. The socket is located in the base and is not visible in the drawing. The bulb is connected to the cover such that rotation of the cover causes the bulb to rotate. The bulb can be turned on and off simply by rotating the cover one way or the other. Alternatively, a switch can be provided for turning the bulb on and off.

With reference to FIG. 3, two hitch-locating devices 30, 32 rest on hitching assembly, generally 34. The hitching assembly is provided with the usual socket or hitch-cap 36 attached to the front arm 38 of a trailer. A ball 40 is fastened to a tongue 42 which extends outwardly from the rear of a vehicle. The ball is received in the hitch-cap when the vehicle is towing the trailer. The ball is held within the hitch-cap by a conventional lock 44 to prevent unintended separation of the ball from the hitch-cap when the vehicle is being used to move the trailer.

Figure 4:
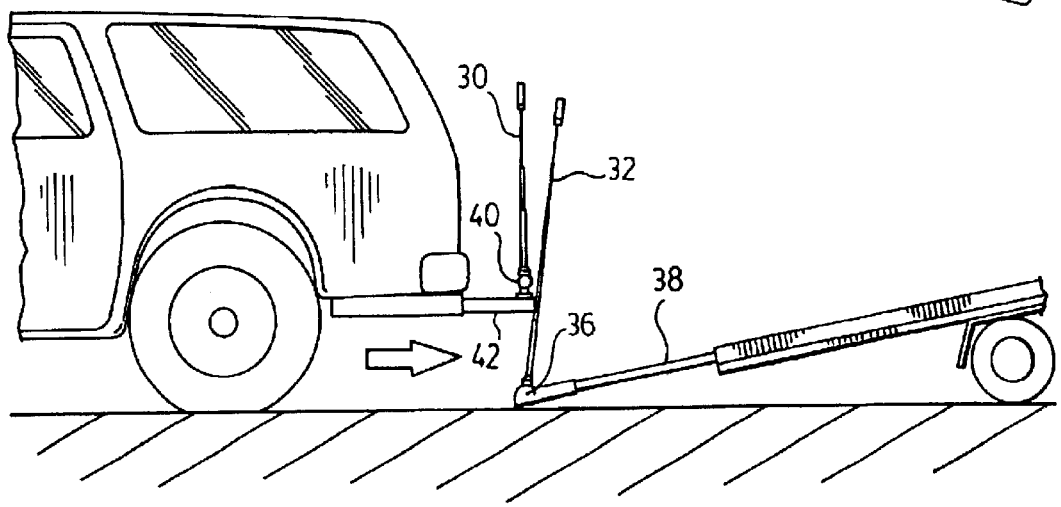
FIG. 4 is an elevation of the hitch and hitch-locating devices showing the way in which the hitch-locating devices operate.

With reference to FIG. 4, the operation of the hitch-locating device is as follows: To prepare the hitch-locating devices for use, one 30 is placed on top of or adjacent to ball 40 while a second 32 is placed on top of or adjacent to the hitch-cap 36. The magnets in the pedestal of the hitch-locating devices hold the devices upright. The electric bulbs in the devices can then be illuminated should the hitching operation be carried out at night or when the devices are not clearly visible to the driver because of adverse weather conditions.

The driver then backs the vehicle slowly in the direction of the arrow toward the trailer. As he does so, he watches the two hitch-locating devices in his rear view mirror and he steers the vehicle in order to bring the two devices into alignment. The driver maintains that alignment as he continues to back up.

The rear view mirror which is referred to herein is the interior mirror which is located in the centre of the vehicle between the driver's and the front passenger's seat and which is attached either to the front windshield or to the ceiling of the vehicle.

When tongue 42 comes into contact with hitch-locating device 32, the device will be knocked over. When the driver sees this, he will know that the hitch-cap and ball are in position to be interconnected. He will then stop the vehicle, get out and go to the rear where he will lift the front arm 38 of the trailer in order to raise the hitch-cap above the ball. He will then lower the trailer so that the ball enters the hitch-cap after which he will lock the ball in place.

In FIG. 4, front arm 38 rests on the ground while the vehicle is being backed up. When hitch-locating device 32 is knocked over, the hitch-cap is ready to be attached to the ball. Before it can be attached, however, the front arm must be lifted and moved sideways in one direction to clear the tongue of the towing vehicle. The arm must then be moved sideways in the opposite direction so that it is over the ball.

To avoid the necessity of having to move the arm sideways in this manner, the front arm must be supported so that it is off the ground and it must be at a level such that the hitch-cap is above the level of the ball. To this end, two requirements must be satisfied: first there must be some way of supporting the arm while it is off the ground and secondly there must be a way of determining the correct height at which the arm must be supported.

Figure 5:
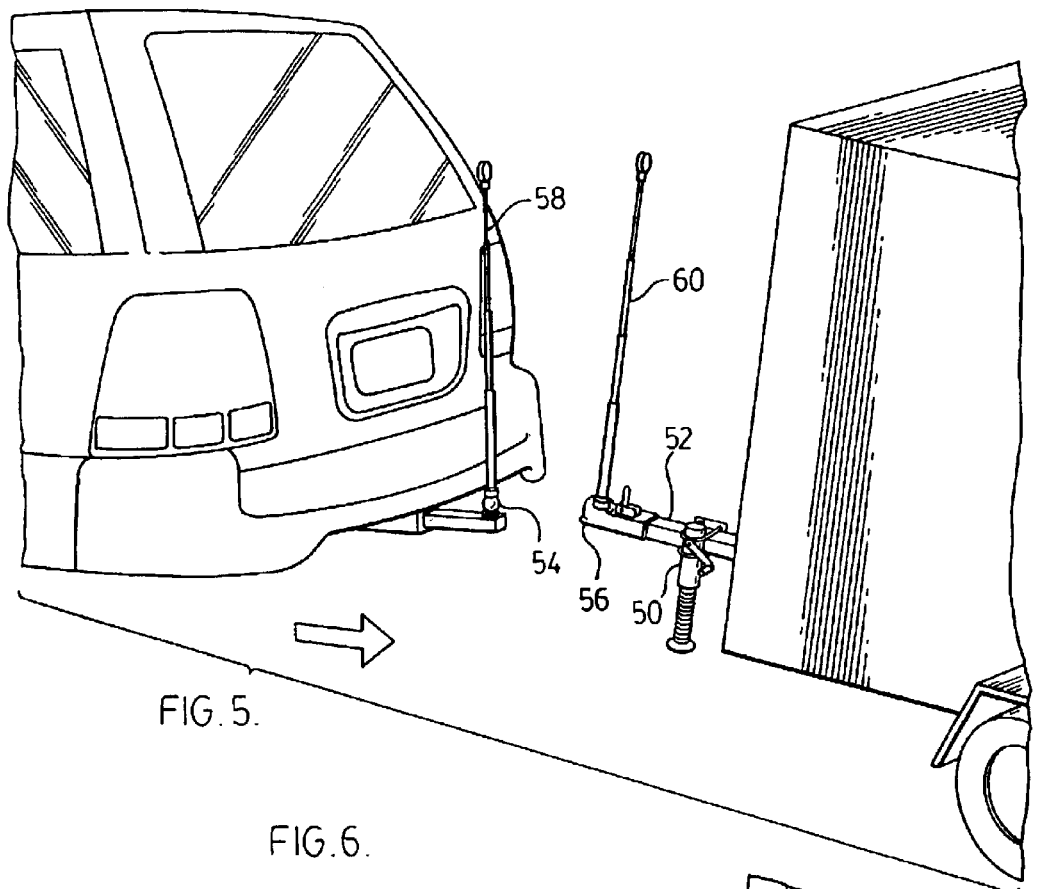
FIG. 5 is a perspective view, similar to that of FIG. 3 except that the front arm of the trailer is off the ground.
Figure 6:
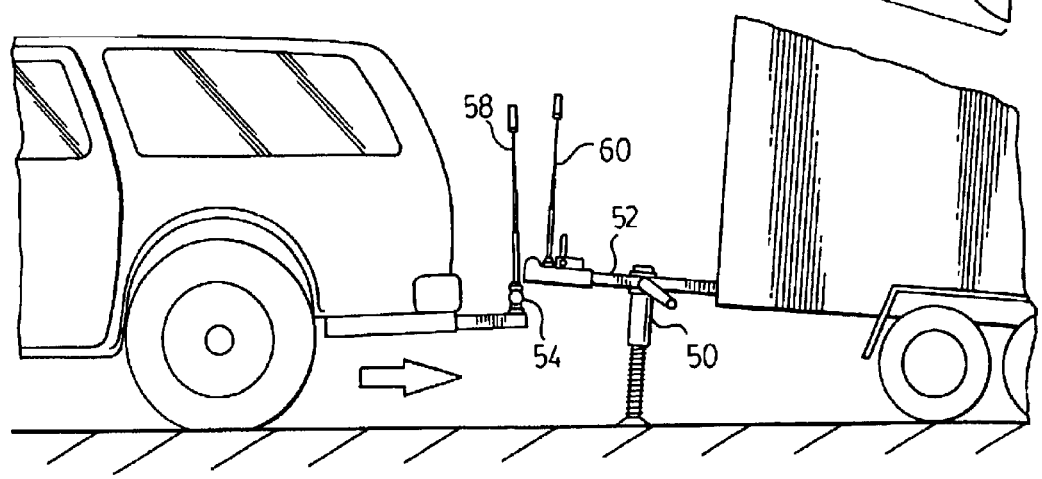
FIG. 6 is an elevation showing the manner in which the trailer of FIG. 5 is connected.

With reference to FIGS. 5 and 6, a jack 50 serves to support the front arm 52 of the trailer. A heavy trailer is conventionally provided with such a jack since most persons do not have the strength to lift the front arm of such a trailer by hand. The jack thus satisfies the first requirement.

As for the second requirement, one of the hitch-locating devices is suitable for determining the correct height of the arm. For the device to be used for this purpose, its pedestal is placed on the ground beside ball 54. The stem is then extended until the top of the indicator is at approximately the same elevation as the top of the ball. The hitch-locating device is then placed beside the hitch-cap 56 and its height is compared with that of the ball. By means of the jack, the arm is raised or lowered to a level at which the hitch-cap is above that of the top of the ball.

One hitch-locating device 58 is placed adjacent to or preferably on top of the ball and the other 60 is placed at or adjacent to hitch-cap. The driver then backs the vehicle in the manner described before. When hitch-locating device 58 strikes the front arm of the trailer, it will topple over and the hitch-cap will be directly above the ball. The handle of the jack can then be turned to cause the arm to descend until the hitch cap rests on the ball. There is no necessity to move the front arm of the trailer back and forth to correctly position the hitch-cap.

It will be understood of course that modifications can be made in the hitch-locating device illustrated and described herein without departing from the scope of the invention as defined in the appended claims

I claim:

1. A method of connecting a hitch-cap attached to the rear of a towing vehicle to a ball of a hitching assembly attached to a trailor including the steps of:

providing a pair of hitch-locating devices each consisting of a pedestal, an indicator, and a stem which extends between and interconnects said pedestal and said indicator and which is straight and free from bends throughout its entire length;

removably placing one said hitch-locating device to the hitch-cap such that said device is visible to a driver of the towing vehicle;

removably placing the other said hitch-locating device to the ball such that said device is also visible to the driver of the towing vehicle;

causing the towing vehicle to move rearwardly toward the trailer;

steering the rearwardly moving vehicle in order to bring the two hitch-locating devices into alignment as viewed by the driver;

continuing to cause the towing vehicle to move rearwardly while the two hitch-locating devices are so aligned until one of the hitch-locating devices is knocked over;

stopping the towing vehicle when the hitch-locating device is so knocked over; and connecting the hitch-cap to the ball.

\* \* \* \* \*